UNITED STATES PATENT OFFICE.

HARRY EDMUND SMITH, OF LONDON, ENGLAND.

REDUCING AGENT OR COMPOSITION FOR USE IN PHOTOGRAPHY.

No. 816,751.     Specification of Letters Patent.     Patented April 3, 1906.

Application filed May 12, 1905. Serial No. 260,144.

*To all whom it may concern:*

Be it known that I, HARRY EDMUND SMITH, chemist, a subject of the King of Great Britain, residing at 3 Ezra Buildings, Columbia Road, London, in the county of London, England, have invented new and useful Improvements Relating to Reducing Agents or Compositions for Use in Photography, of which the following is a specification.

This invention relates to chemical agents or compositions for use in reducing photographic negatives, prints, &c., and to the method of applying such reducing agents. Reducers for photographic purposes should exercise a selective action—that is to say, they should take effect, primarily, upon the darkest or thickest parts of the negative or print, leaving the lighter parts, which require no reduction, in as nearly the original state as is possible. After making extensive experiments I have discovered a reducing agent which fulfils the requirements in a satisfactory manner. This agent contains cobalt and the nitrite radical group ($NO_2$) in combination with such metals as potassium, sodium, or ammonium, with or without further acid radicals, such as the ($SO_4$) group or chlorin, (Cl,) in conjunction with an acid, usually sulfuric acid, ($H_2SO_4$.) The cobalt is usually present in the form of a cobalt amin, or it may be in the form of a suitable salt which, with other reagents used, would introduce the ingredients of a cobalt amin or of an allied compound.

In order to make the invention clear, I will first describe in detail the preparation and manner of use of one suitable reducing agent, and certain alternatives or equivalents will be mentioned subsequently.

Four grains of "Erdmann's salt," $Co_2.(NH_3)_4.(NO_2)_8K_2$ are dissolved in fifty cubic centimeters of water by warming said water toward, but well short of, its boiling-point. An orange-red solution is thus obtained which should be cooled (by cold-water circulation round the containing vessel, for instance) until its temperature is 60° or 70° Fahrenheit, for example, when an equal bulk (fifty cubic centimeters) of dilute sulfuric acid of fifteen-per-cent. strength is added. The mixed solutions may be allowed to cool or may be cooled, if necessary, by water circulation, after which the reducing agent is ready for use.

The action of this reducer is selective to the required degree, as it attacks the deeper deposits of silver in the film on the plate, celluloid film, or paper much more readily than the half-tone and lighter deposits. Hence by its use a hard negative or print may have its scale of gradation softened without the loss of any appreciable amount of the lighter deposits or half-tones. Indeed, if the reducing solution is allowed to act for a long enough period it will be found in many cases to intensify the lightest deposits of silver, while at the same time reducing the deepest deposits. The action of the reducer is slow, so that, unlike rapid reducers which quickly attack the light silver deposits, this agent will in use involve no risk of mistake by allowing the reducing action to go too far before the plate, film, or paper is removed from the dish. It is advisable when using the reducer to rock the dish from time to time and if any small bubbles form on the film to remove them; but with the reducer made as above there will be little or no tendency for bubbles to form. If the agent is made up of greater strength, more precaution will be necessary to prevent trouble from this cause.

For use in reducing bromid prints the solution may be somewhat weaker than the strength above given, and the action will be slower.

After sufficient reduction has taken place the negative or print should be washed for, say, five minutes in running water and then immersed in a bath of ammonium hydrate ($NH_4OH$) of ten-per-cent. strength for, say, three minutes, and after further washing the negative or print may be dried in the usual manner. The ammonium hydrate so used acts to prevent the tendency for the print or negative to turn to a brownish color subsequently to the reduction.

In place of Erdmann's salt the following cobalt amins and allied salts or mixtures of the same may be sometimes used with an acid, such as sulfuric acid, to make reducing solutions which act in a more or less selective manner: Diammine cobalt nitrites of the general formula $M_2(Co_2.(NH_3)_4(NO_2)_8)$, where $M_2$ stands for an equivalent of the potassium in Erdmann's salt; croceo cobaltic chlorid, $Co_2Cl_2(NO_2)_4(NH_3)_8$; xantho cobaltic chlorid, $Co_2Cl_4(NO_2)_2(NH_3)_{10}$; flavo cobaltic chlorid, $Co_2Cl_2(NO_2)_4(NH_3)_{10}$; tri-potassio cobaltic nitrite, $Co_2, 6NO_2, 6(KNO_2)$ plus water of crystallization; di-sodio cobaltic nitrite, $Co_2, 6NO_2, 4(NaNO_2)$ plus water of crystallization; tri-sodio cobaltic nitrite, $Co_2, 6NO_2, 6(NaNO_2)$ plus water of crystallization; di-ammonio cobaltic nitrite, $Co_2$, $6NO_2$, $4(NH_4NO_2)$ plus water of crystallization; tri-ammonio cobaltic nitrite, $Co_2$, $6NO_2$, $6(NH_4NO_2)$ plus water of crystallization.

It is of little importance whether it is the chlorid, bromid, nitrate, or like salt of, say, the croceo or xantho cobalt which is used; but a nitrite is generally the best. Salts such as chromates and bichromates should be avoided, because these, with the acid, would tend to exert a bleaching action upon the image.

Instead of using the salts ready made as above I may use a simple mixture in solution of a cobalt salt, potassium nitrite, and dilute sulfuric acid, with or without the addition of salts of ammonium, lithium, or magnesium, (ammonium salts by preference.) Such a solution is, however, more difficult to control in practice and is apt to attack the light deposits as well as the darker ones. The di and tri sodio and ammonio cobaltic nitrites are somewhat rapid in their action, probably owing to their greater solubility as compared with many of the cobalt amins, so that solutions should be used of less strength than that given for Erdmann's salt above, and in order to prevent the subsequent appearance of a brown coloration thorough washing and a longer immersion of the prints or the like in the ammonia-bath are necessary or desirable.

Generally the salts containing cobalt and the $(NO_2)$ radical group and usually another acid radical, such as (Cl), $(NO_3)$, or $(NO_2)$, with ammonium, potassium, sodium, or other metals or combinations of metals, together with an acid, such as sulfuric acid, may be used to make the reducer; but certain of these have disadvantages in use peculiar to one or more of their component parts, and I have obtained the best results in experiments with Erdmann's salt, the ammonio and sodio cobaltic nitrites, and mixtures of these. In place of sulfuric acid I may use dilute nitric acid of about ten-per-cent. strength as compared with the fifteen-per-cent. strength of the sulfuric acid, or other acids, such as hydrochloric acid, may sometimes be used; but sulfuric acid usually gives the most satisfactory results.

What I claim is—

1. In a photographic reducing agent the combination of a compound containing cobalt and the nitrite radical group $(NO_2)$, with an acid.

2. In a photographic reducing agent the combination of a compound containing cobalt, the nitrite radical group $(NO_2)$, and a metal of the alkali group, with an acid.

3. In a photographic reducing agent the combination of a substance containing cobalt, a base other than cobalt, the nitrite radical group $(NO_2)$, and an acid.

4. The combination with a photographic reducing agent containing cobalt and the nitrite radical group, with an acid, of a bath of dilute ammonia whereby subsequent discoloration may be prevented.

In testimony whereof I have signed my name to this specification in the presence of two subscribing witnesses.

HARRY EDMUND SMITH.

Witnesses:
   HUBERT A. GILL,
   JOHN A. JORDAN.